United States Patent [19]
Feustel et al.

[11] Patent Number: 4,827,518
[45] Date of Patent: May 2, 1989

[54] SPEAKER VERIFICATION SYSTEM USING INTEGRATED CIRCUIT CARDS

[75] Inventors: Timothy C. Feustel, Hanover; Mark A. Glemboski, Newton; Michael R. Ordun, Randolph; George A. Velius, Morristown; Stephen B. Weinstein, Summit, all of N.J.

[73] Assignee: Bell Communications Research, Inc., Livingston, N.J.

[21] Appl. No.: 82,198

[22] Filed: Aug. 6, 1987

[51] Int. Cl.[4] .......................... G10L 5/06; G06K 5/00
[52] U.S. Cl. ...................................... 381/42; 235/382
[58] Field of Search .................... 381/42, 43; 235/382, 235/382.5, 487, 492

[56] References Cited

U.S. PATENT DOCUMENTS

| | | | |
|---|---|---|---|
| 3,896,266 | 7/1975 | Waterbury | 381/42 |
| 4,054,749 | 10/1977 | Suzuki et al. | 381/42 |
| 4,471,216 | 9/1984 | Herve | 235/492 X |
| 4,590,365 | 5/1986 | Okada | 235/492 X |
| 4,653,097 | 3/1987 | Watanabe et al. | 381/42 |
| 4,684,791 | 8/1987 | Bito | 235/382 X |

FOREIGN PATENT DOCUMENTS

86/06197 10/1986 PCT Int'l Appl. .................. 381/42

OTHER PUBLICATIONS

L. R. Rabiner and R. W. Schafer, *Digital Processing of Speech Signals*, "Short-Time Fourier Analysis", Chapter 6, pp. 250-354, Prentice-Hall, 1978.

*Primary Examiner*—William M. Shoop, Jr.
*Assistant Examiner*—Marc S. Hoff
*Attorney, Agent, or Firm*—James W. Falk

[57] ABSTRACT

A speaker verification and voice command system utilizing speech templates stored in an integrated circuit card is disclosed. To verify the user's identity, a comparison is made between a plurality of reference speech templates stored in the user's integrated circuit card and a test template formed from a word or words spoken by the user.

3 Claims, 2 Drawing Sheets

SPEAKER VERIFICATION SYSTEM USING INTEGRATED CIRCUIT CARDS

FIELD OF THE INVENTION

The present invention relates to speaker verification and voice command at a terminal utilizing speech templates stored in an integrated circuit card.

BACKGROUND OF THE INVENTION

An integrated circuit card or a "smart card" is a card which typically has a size similar to that of an ordinary credit card and which contains an integrated circuit such as a microprocessor and/or memory.

Biometric identity verification schemes are often associated with integrated circuit cards. However, such prior art biometric identity schemes are generally signature or fingerprint comparisons favored for financial services applications such as credit verification at point of sale. Voice verification and command is of greater interest for the provision of communications services, since it is natural in the telephony environment, is fast, and can be used conveniently in wall mounted, portable and mobile terminals. No complete system for speaker verification and voice command relying on storage of reference speech templates in integrated circuit cards has been disclosed in the prior art. Accordingly, it is an object of the present invention to provide a complete system for speaker verification and voice command based on the storage of reference speech templates in an integrated circuit card.

SUMMARY OF THE INVENTION

The present invention provides a scheme for verifying the claimed identity of an individual at a terminal such as a telephone or other communications terminal. It is intended to secure access to services and privileges for authorized users, ease and facilitate human-machine interaction, protect the privacy of personal information and deter fraud. The applications include personalization of non-proprietary communications terminals and access to customized services and personal information such as data files and received messages.

The speaker verification system utilizes an integrated circuit ("smart") card assigned to the user, a smart card interfacing device built into or attached to the terminal, and circuitry or a body of software incorporating known algorithms for accomplishing speech feature extraction and comparison. The identity claim is made by data in the card and verified by analysis of a word or words spoken by the user after prompting by the terminal. This analysis includes a comparison of a test template formed using the spoken word or words with reference speech templates stored in the card.

Voice commands for controlling particular services subsequent to identity verification may also be recognized by speaker dependent recognition algorithms involving comparisons with reference speech templates stored in the card. Illustratively, the card stores a set of reference speech templates for each of a plurality of commands. An example of such a command is to order the dialing of a particular telephone number.

To use the verification scheme of the present invention, the following operational sequence illustratively takes place.

1. The user first inserts his assigned card into the smart card interfacing device built into the terminal. After the card receives power and after the execution of data communications handshaking protocols, an unprotected identity of the user (e.g. a name) is transmitted from the card to the terminal. The terminal responds with a signaled, spoken or visual acknowledgement.

2. The terminal verifies itself to the card and the card verifies itself to the terminal. Prior art encryption techniques are available to accomplish this.

3. Text or phonetic descriptors of one or more candidate verification words or phrases are transmitted from the card to the terminal. The terminal visually or aurally prompts the user to speak one of these candidates.

4. The word or phrase spoken by the user is digitized in the terminal and processed in accordance with known algorithms to form a test speech template. If the data derived from the spoken word or phrase is unsuitable because of ambient noise, equipment malfunction or other detectable cause, the user is prompted to submit an alternative verification, such as a keyed-in password or a keyed-in response to a personal question such as "what is your mother-in-law's name?"

5. If the data derived from the spoken word or phrase is technically satisfactory, the terminal instructs the card to transmit to it a multiplicity of previously stored reference speech templates (typically four or five) corresponding to the spoken word or phrase. Alternatively, if the storage and processing capabilities of the card are adequate, the terminal can transmit the data derived from the spoken word or phrase into the card.

The reference templates stored in the card have been created previously by means of the same processing algorithm used to form the test template. A reference template, in compressed form, will typically require 250 to 512 bytes of storage capacity.

6. A closeness metric is computed in the terminal or the card, to compare the test template derived from the spoken word or phrase and each reference template for that word or phrase stored in the card. Based on this analysis, an "accept" or "reject" decision is reached.

7. If the decision is to "accept", an appropriate modification of the set of stored reference templates for the word or phrase used for verification is made, and the revised template set is stored in the card in place of the template set just used. A typical revision would be to discard the oldest reference template stored in the card and substitute in its place the test template just used. A decision to accept is followed by access to protected memory locations in the card and to service privileges extended through the terminal, which are contingent on identity verification.

8. If the decision is to "reject", the user in particular embodiments will be offered another opportunity to speak the same word, be requested to speak a different word, or be prompted to use a backup password or other alternative identity verification means. A third decision category, "referral" to a local human or to an online human or mechanical verification authority may also be provided. The number of verification attempts allowed at each transaction is limited according to instructions in the card. An identity verification history is preferably stored in the card. Future accept/reject decisions may be functionally dependent on this history.

After the identity of the user is established, voice commands may be used to control particular service. For this purpose, the card stores a set of reference templates, for each command in a list of valid commands. Illustratively, in a particular embodiment of the invention, a user may verbally request that a particular telephone number be dialed. In this case the verbal command is digitized in the terminal and processed in accordance with a known algorithm to form a test template. This test template is then compared to the sets of command reference templates stored in the card to determine which command was spoken by the user. The speech processing algorithms used to form the reference and test templates in the verification and command processes are different since the purposes are different. In the case of verification, a speech processing algorithm is used which can enable identification of the user. In the case of voice command, a speech processing algorithm is used which can enable identification of a particular command.

DETAILED DESCRIPTION

Figure 1:
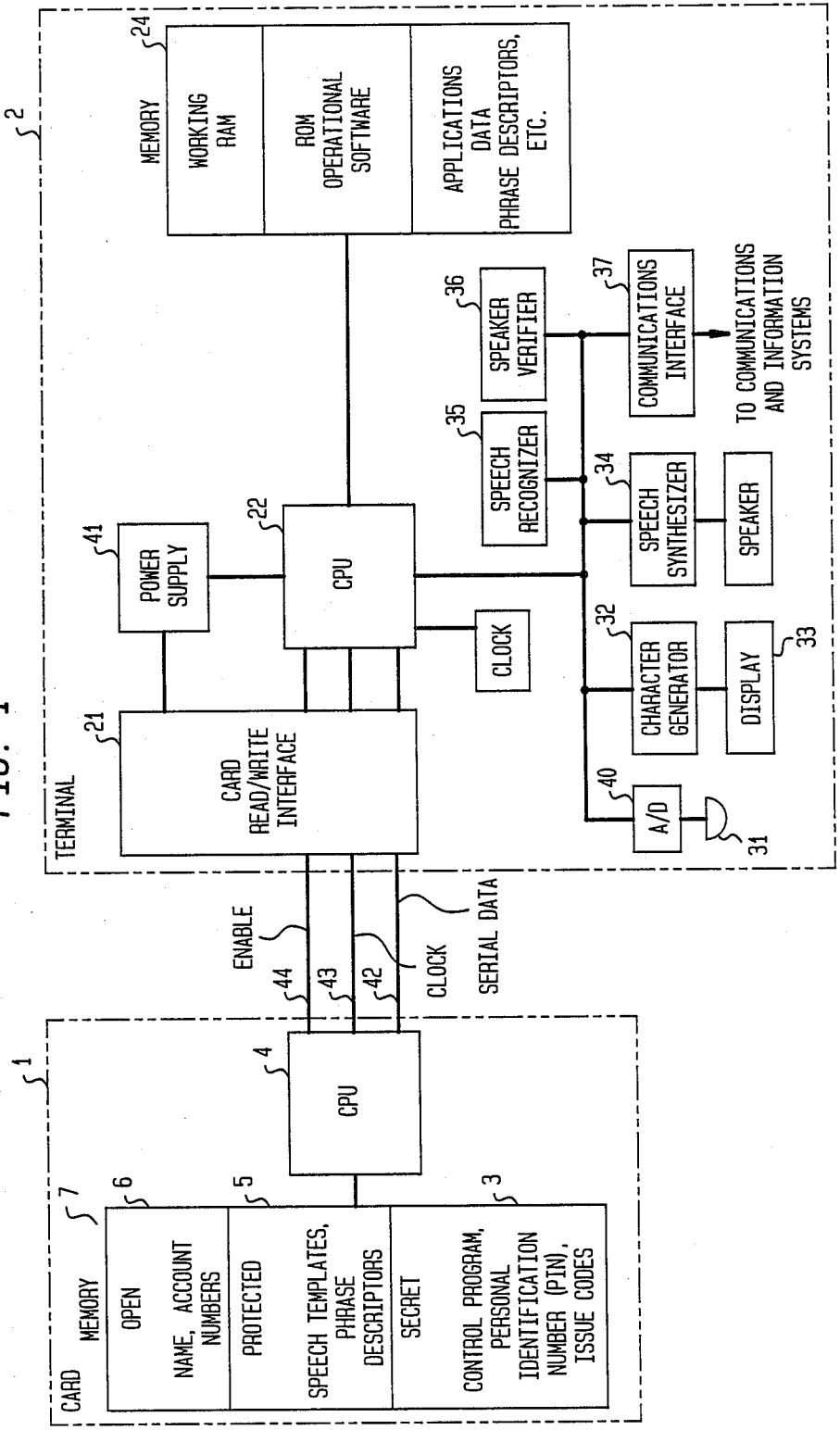
FIG. 1 schematically illustrates an integrated circuit card stores speech templates and a terminal in which the card be used, in accordance with an illustrative e of the invention.

FIG. 1 illustrates a system comprising an integrated circuit or "smart" card 1 capable of storing speech templates and a terminal 2. The card may be used at the terminal for verifying the claimed identity of an individual and for implementing voice commands.

The card 1 comprises memory 7 and a microprocessing unit 4. The memory 7 comprises three fields: an open field 6, a protected field 5, and a secret field 3.

The card is received by the user from the issuer. The issuer initializes the card by writing the issuer identity, security codes, and user identity (e.g. name and account number) into the card. The issuer security code and a user password are stored in the secret field 3 of the card memory 7 and can be accessed only by computer programs executed within the card. Additional security information, such as the answer to a personal question (e.g. what is your mother-in-law's name?) can optionally be included. The issuer may also enter a payment authorization such as a credit restriction or prepaid balance and period of validity.

The card 1, once in the user's possession, is trained for speaker verification and voice command while inserted into the terminal 2. The user inserts the card 1 into the card read-write interface 21 of the terminal 2. In the illustrative embodiment of the invention shown in FIG. 1, the connections between the card 1 and terminal 2 are electric. Thus, the processing unit 4 and other electronic circuitry in the card 1 receive power from the power supply 41 of the terminal 2 as does the electronic circuitry in the terminal 2. Serial data is transmitted between the card 1 and the interface 21 of the terminal 2 via bus 42. Lines 43 and 44 are provided for clock and enable signals. In an alternative embodiment of the invention the card and terminal may be optically connected.

After the user inserts card 1 into the read-write interface 21 of the terminal 2, under the control of programs stored in the card memory 3 and terminal memory 24, an automatic exchange is carried out in which the signaling protocol between the card and terminal is established and the card is recognized by the terminal. The user's non-secret identity (e.g. name or identification number) is extracted from the open field 6 of the card memory 3 and displayed in a welcoming message on the terminal display device 33.

After this initial interchange between card and terminal is completed, the terminal then prompts the user, visually and/or aurally, to speak a particular verification or command phase. Such prompting is carried out under control of a conventional program stored in terminal memory 24, which program is run on terminal CPU 22. A character string describing the verification phrase is extracted from the terminal memory 24 and transmitted to a character generator and display 32, 33 and/or to a text-to-speech synthesizer 34 which can be used for the visual and/or aural prompting of the user, respectively.

The user's response is input via microphone 31 and analog-to-digital converter 40. The resulting digitized speech signal is routed to and analyzed in either speaker verifier 36 or speech recognizer 35 depending on whether the prompted phrase is for speaker verification or voice command. Alternatively, the speaker verifier and speech recognizer may be realized entirely in software stored in terminal memory 24 and executed by terminal CPU 22.

When the card I is being "trained", the speaker verifier 36 or speech recognizer 35 is used to extract certain characteristic features from the digitized version of the spoken phrase, which extracted features are used to form a reference speech template. Examples of such features include cepstral coefficients. Cepstral coefficients are coefficients of a polynomial which models the spectrum of the speech signal during a particular time window. Thus, the cepstral coefficients vary from time window to time window. A template comprises a plurality of cepstral coefficient sets. Illustratively, a user verification reference template is formed as a result of processing in speaker verifier 36. A voice command reference template may be formed as a result of processing in the speech recognizer 35. The reason for this is that the voice command templates and the user verification templates are formed using different speech processing algorithms. For example, algorithms for verification and voice command may weight cepstral coefficients differently. In an alternative embodiment of the invention, filter bank outputs may be used to form the speech templates. Examples of such filter banks are disclosed in L. R. Rabiner and R. W. Schafer "Digital Processing of Speech Signals" Chapter 6, copyright 1978, Bell Telephone Laboratories.

Each reference speech template including a time stamp is stored in the protected field 5 of the card memory 7 via the terminal CPU 22, card read-write interface 21 and card CPU 4 under the control of interacting programs in the terminal memory 24 and card memory 3. Techniques for data transfers between the card and terminal are well known in the prior art. The character string or standard phonetic descriptor describing the words or phrase from which each reference template was derived is also stored in the card memory along with a pointer (i.e. memory address) to the corresponding template. The acceptance of a spoken phrase is signaled to the user by passing an appropriate notification message from memory 24 to display 33 and/or text-to-speech synthesizer 34. Since several speech templates are required for each verification or command phrase, the above procedure is repeated several times. Thus, it is through the storage of reference speech template sets that the card 1 is "trained" for speaker verification and voice command. When training is completed, the card 1 is removed from the terminal 2. The card may subsequently be used to access particular services at appropriate terminals until financial or period of validity limits are reached.

In order to use the card to obtain access to particular services, the user inserts a previously trained card 1 into the read-write interface 21. As in the case of the training procedure, an automatic interchange takes place between the card and terminal, during which, the card is accepted by the terminal, the signalling protocol is established, the card and terminal mutually authenticate themselves and the non-secret user identity is extracted from the card memory and displayed as part of a greeting to the user on the terminal's display.

A computer program stored in terminal memory 24 causes the terminal to send to the card CPU 4 a command requesting the character string or phonetic descriptor corresponding to the word or phrase to be used for speaker verification and pointers to the locations in protected field 5 of the card memory 7 at which are stored the multiple reference templates corresponding to that descriptor. A computer program stored in the card memory 7 responds by transferring the requested data to the terminal memory 24 via the card CPU 4, read-write interface 21 and terminal CPU 22. The character string or phonetic descriptor is in turn transmitted to the display 33 and/or speech synthesizer 34 to prompt the user to speak the verification phrase.

Under control of a computer program stored in the terminal, the voice response of the user is received by way of microphone 31 and is digitized by means of analog/digital converter 40. The digitized speech signal is then processed in speaker verifier 36 or alternatively used as data input to a speaker verification program resident in terminal memory 24. In either case, a test template is computed from the processed speech signal using the same algorithm that was used to compute the verification reference speech templates during the training session described above (e.g. computation of cepstral coefficients). The multiple reference templates stored in the card are retrieved one by one using the pointers previously transferred to the terminal memory. These reference templates are inputted to the speaker verifier or equivalent software program. When each reference template is transferred from the card memory 7 to the speaker verifier or stored program, it is compared to the test template through computation of a closeness metric. When the full set of closeness metrics is computed, the closeness metrics are utilized by a stored program in the terminal to issue a decision. The decision is either "accept", "reject", or "try another identification mechanism".

If an "accept" decision is made, the appropriate message is sent to display 33 and/or speech synthesizer 34. A new template may be transmitted from speaker verifier 36 to the protected field of the card memory 7, along with a pointer to a template storage location, to replace one of the previously stored reference templates. This new template may be the test template, i.e. derived solely from the phrase spoken by the user for verification or alternatively may be an appropriate combination of the test template with the reference templates previously stored in the card memory, such as a simple average.

A further automatic personalization of the terminal follows speaker verification. For example, if the terminal is an integrated voice/data communications terminal, data are extracted from the card memory specifying personal telephone numbers, a personal calling directory, billing codes, calling privileges and limitations, interexchange and data network carrier access codes, an electronic mailbox address, service access codes, and/or service selections. The terminal is able to communicate with a telecommunications network to supply such services by way of communications interface 37.

As indicated above, control of the now accessed services may be accomplished, in particular embodiments of the invention by way of voice command. The voice command procedure differs somewhat from the user verification procedure. One difference is that no prompting of the speaker is needed other than a notification that commands will be accepted. Furthermore, the "accept" decision of the verification procedure is replaced by a number of possible recognition decisions corresponding to the available command set. The command speech templates, the closeness metric and any other relevant design criterion are optimized for distinguishing among commands rather than for distinguishing among speakers.

The user is prompted, via display 33 and/or text-to-speech synthesizer to indicate completion of a utilization session by voice or keyboard means. When this is done, services opened by use of the card are closed, user specific data stored in terminal memory 24 are erased, all communications connections out of and into the terminal through communications interface 37 are terminated, and the user is prompted to remove the card.

Figure 2:
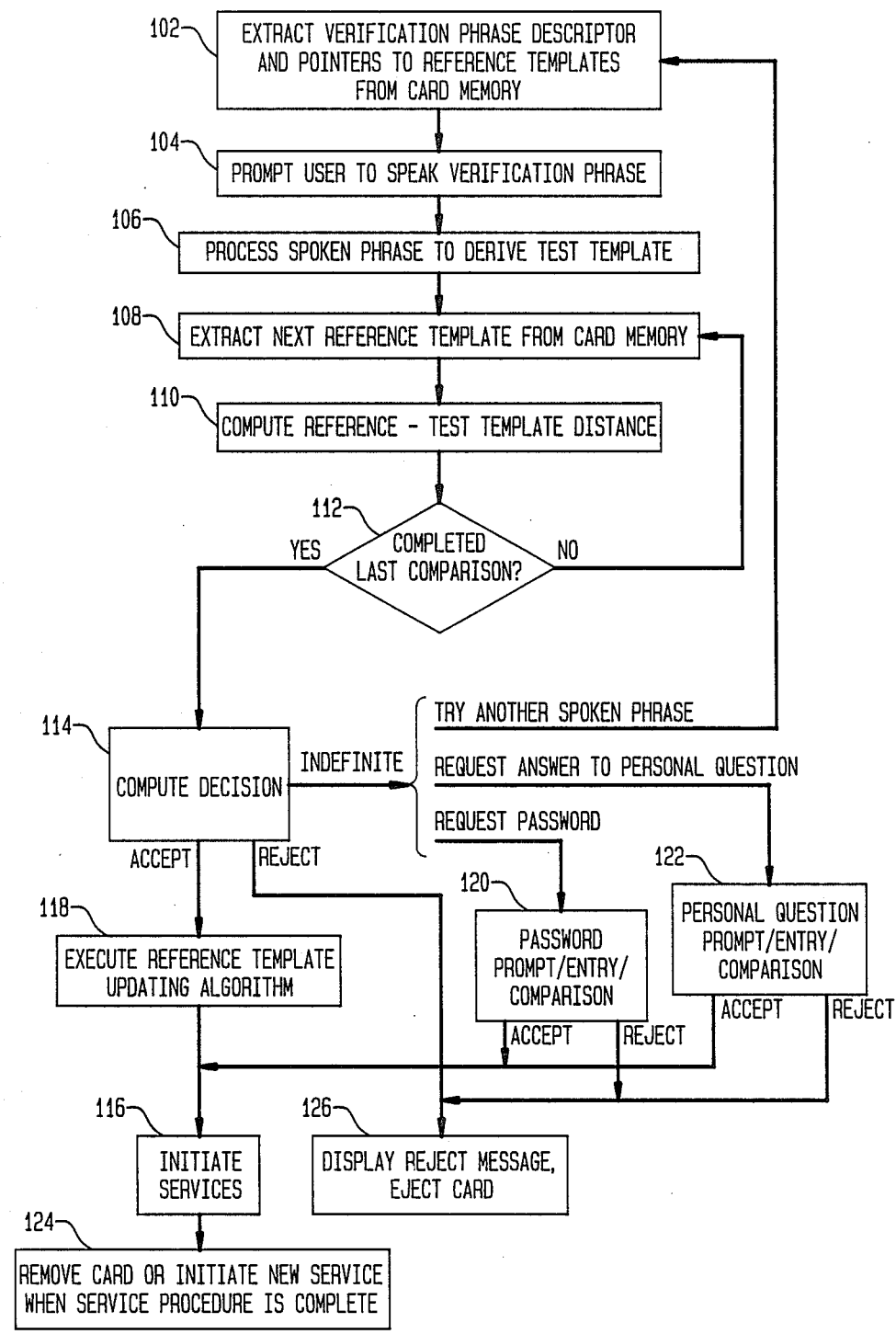
FIG. 2 is a flow chart which illustrates the sequence of operations of the card and terminal of FIG. 1 when used for voice verification, in accordance with an illustrative embodiment of the present invention.

The sequence of operations necessary for using smart card 1 and terminal 2 to verify the identification of a user is reviewed in connection with the flow chart of FIG. 2. As indicated above, the card is inserted into the terminal and startup protocols are executed. The card and terminal then authenticate themselves to one another. After this, the following sequence is followed:

(1) Text or phonetic descriptors of one or more candidate words or phrases for speaker verification are transmitted from the card to the terminal. The terminal prompts the user to speak one of these candidates, which may be randomly selected if there are more than one. (Boxes 102 and 104 of FIG. 2).

(2) The word or phrase spoken by the user is digitized by the terminal and processed to extract the test speech template. (box 106 of FIG 2) (If the data derived from the spoken word or phrase are unsuitable because of ambient noise, equipment malfunction, or other detectable cause, and assuming a keyboard is available, the user is prompted to submit alternative verification, such as a keyed-in password or a keyed-in response to a personal question such as "what is your mother-in-law's name"? This keyed-in sequence is transmitted to the card for internal comparison with a stored reference.)

(3) If the data derived from the spoken word or phrase are technically satisfactory, the terminal instructs the card to successively transmit to it each of the stored reference templates for that word or phrase. Each template typically occupies 256 to 512 bytes of memory. (box 108)

(4) A closeness metric is computed (boxes 110, 112, 114) in the terminal, between the test template derived from the spoken word or phrase and each reference template received from the card. A known algorithm is executed to arrive at an "accept", "reject", or "test further" decision. The algorithm achieves a specified compromise between false rejection (of a legitimate cardholder) and false acceptance (of an imposter).

(5) If the decision is to "accept", i.e. the claimed identity is verified by the spoken sample, instructions are sent from terminal to card to open applications and memory locations of the card relevant to services and privileges accessed by the card. (box 116

(6) Given a decision to "accept", the reference template set stored in the card memory is optionally updated. Several updating algorithms are possible including:

(a) Substituting for a previously stored reference template an average template which averages in the newly accepted test template of the spoken word or phrases, or (b) Discarding the oldest reference template and substituting the new test template. (box 118)

(7) If the decision is not to accept, the user may, at the option of the system designer, be offered another opportunity to speak the same word, be requested to speak a different word, or be prompted to use a backup password (box 120). An alternative identity verification means such as providing an answer to a personal question may also be used (box 122). An additional decision category, "referral" to a local human or to an online human or mechanical verification authority, may also be provided. The number of verification attempts allowed at each transaction is limited according to instructions in the card, and an identity verification history is optionally stored in the card. Future accept-/reject/referral decisions may be made functionally dependent on this history.

(8) A visual or aural indicator (box 124) signals the user to remove the card or initiate a new services procedure when a service procedure is completed.

(9) A reject decision is also communicated using a visual or aural indicator (box 126).

In short, a speaker verification and voice command system utilizing speech templates stored in a integrated circuit card is disclosed. To verify the user's identity, a comparison is made between a set of reference speech templates stored in the user's integrated circuit card and a test template derived from a word or words spoken by the user. Templates stored in the card may also be used to distinguish among various spoken commands.

Finally, the above described embodiments of the invention are intended to be illustrative only. Numerous alternative embodiments may be derived by those skilled in the art, without departing from the spirit or scope of the following claims.

What is claimed is:

1. In combination,
    an integrated circuit card including an electronic memory for storing one or more first reference speech templates formed in accordance with a first speech processing algorithm and corresponding to a verification word or phrase and for storing one or more second reference speech templates formed in accordance with a second speech processing algorithm and corresponding to one or more speech commands, which commands enable access to an individualized set of telecommunctions services,
    a terminal for forming a first test speech template from a speech signal of a prospective user and corresponding to said verification word or phrases for verifying if the prospective user is a legitimate user, and for forming a second test speech template from a command spoken by said legitimate user to enable said legitimate user to selectively access said individualized set of telecommuncations services, and
    comparison means for comparing said first test template with at least one of said first reference templates and said second test template with at least one of said second reference templates.

2. A method for obtaining access to telecommunications services comprising the steps of
    providing an integrated circuit card including an electronic memory for storing one or more first reference speech templates formed in accordance with a first speech processing algorithm and corresponding to a verification word or phrase and for storing one or more second reference speech templates formed in accordance with a second speech processing algorithm and corresponding to one or more spoken commands, which commands enable access to an individualized set of telecommunications services,
    speaking said verification word or phrase by a prospective user into a microphone associated with a terminal,
    forming a first test template in said terminal from said spoken verification word or phrase in accordance with said first speech processing algorithm,
    comparing said first test template with one or more of said first reference templates to determine if said prospective user is a legitimate user of said terminal,
    if said prospective user of said terminal is a legitimate user, speaking a command into said microphone,
    forming a second test template from said spoken command in said terminal in accordance with said second speech processing algorithm, and
    comparing said second test template with one or more of said second reference templates to selectively provide said legitimate user with access to said set of telecommunications services.

3. A terminal for use in obtaining access to telecommunications services comprising
    means for receiving an integrated circuit card including an electronic memory for storing one or more first reference speech templates formed in accordance with a first speech processing algorithm and corresponding to a verification word and for storing one or more second reference speech templates formed in accordance with a second speech processing algorithm and corresponding to one or more spoken commands, which commands enable access to an individualized set of telecommunications services,
    microphone means for receiving spoken verification words and spoken command words,
    first speech processing means for converting a spoken verification word into a first test speech template in accordance with said first speech processing algorithm,
    second speech processing means for converting a spoken command word into a second test speech template in accordance with said second speech processing algorithm, and
    comparator means for comparing said first test template with one or more of said first reference templates to determine if a prospective user is a legitimate user and for comparing said second test speech template with one or more of said second reference speech templates to enable a user to selectively access said telecommunications services.

* * * * *

UNITED STATES PATENT AND TRADEMARK OFFICE
CERTIFICATE OF CORRECTION

PATENT NO. : 4,827,518

DATED : May 2, 1989

INVENTOR(S) : Timothy C. Feustel, Mark A. Glemboski, Michael R. Ordun, George A. Velius, and Stephen B. Weinstein It is certified that error appears in the above-identified patent and that said Letters Patent is hereby corrected as shown below:

Column 1, line 40, before "personalization" insert --fast--.
Column 3, line 18, before "stores" insert --which--;
         line 19, change "e of" to --embodiment of--.
Column 7, line 5, after "116" insert --)--.

Signed and Sealed this

Twenty-seventh Day of August, 1991

Attest:

HARRY F. MANBECK, JR.

Attesting Officer

Commissioner of Patents and Trademarks